(12) United States Patent
Tashiro et al.

(10) Patent No.: US 9,508,257 B2
(45) Date of Patent: Nov. 29, 2016

(54) ROAD DETECTION LOGIC

(71) Applicants: ZENRIN CO., LTD., Kitakyushu-shi (JP); TOYOTA JIDOSHA KABUSHIKI KAISHA, Toyota-shi (JP); AISIN AW CO., LTD., Anjo-shi (JP)

(72) Inventors: Hiroyuki Tashiro, Kitakyushu (JP); Kei Hiroo, Kitakyushu (JP); Yoshitaka Nishino, Kitakyushu (JP); Tomoki Kodan, Nagoya (JP); Motohiro Nakamura, Okazaki (JP); Sadahiro Koshiba, Takahama (JP); Kazuteru Maekawa, Miyoshi (JP)

(73) Assignees: ZENRIN CO., LTD., Kitakyushu-shi (JP); TOYOTA JIDOSHA KABUSHIKI KAISHA, Toyota-shi (JP); AISIN AW CO., LTD., Anjo-shi (JP)

( * ) Notice: Subject to any disclaimer, the term of this patent is extended or adjusted under 35 U.S.C. 154(b) by 0 days.

(21) Appl. No.: 14/648,990

(22) PCT Filed: Feb. 7, 2014

(86) PCT No.: PCT/JP2014/000655
§ 371 (c)(1),
(2) Date: Jun. 2, 2015

(87) PCT Pub. No.: WO2014/125802
PCT Pub. Date: Aug. 21, 2014

(65) Prior Publication Data
US 2015/0317900 A1    Nov. 5, 2015

(30) Foreign Application Priority Data

Feb. 12, 2013   (JP) .................... 2013-024084

(51) Int. Cl.
G08G 1/01     (2006.01)
G09B 29/10    (2006.01)
G01C 21/32    (2006.01)

(52) U.S. Cl.
CPC ............ *G08G 1/0112* (2013.01); *G01C 21/32* (2013.01); *G08G 1/0129* (2013.01); *G08G 1/0141* (2013.01); *G09B 29/106* (2013.01)

(58) Field of Classification Search
CPC ............ G08G 1/0112; G08G 1/0129; G08G 1/0141; G01C 21/32; G09B 29/106
USPC .......................................... 701/117
See application file for complete search history.

(56) References Cited

U.S. PATENT DOCUMENTS

| 8,731,808 B2 | 5/2014 | Tashiro et al. |
| 2006/0058940 A1 | 3/2006 | Kumagai et al. |

(Continued)

FOREIGN PATENT DOCUMENTS

| JP | 9-243391 | 9/1997 |
| JP | 2006-79483 | 3/2006 |

(Continued)

OTHER PUBLICATIONS

International Search Report issued May 13, 2014, in PCT/JP2014/000655, filed Feb. 7, 2014.

Primary Examiner — McDieunel Marc
Assistant Examiner — James E Stroud
(74) Attorney, Agent, or Firm — Oblon, McClelland, Maier & Neustadt, L.L.P.

(57) ABSTRACT

An analyzer of the invention adequately analyzes a change in road network by using probe information generated with driving of a vehicle. This analyzer determines a traffic amount of vehicles passing through a specified section included in the road network from a plurality of the probe information accumulated over a predetermined period. The analyzer also determines a discontinuity rate, which is a rate of incidents that vehicle locations are discontinuous in the specified section, from the plurality of probe information accumulated over the predetermined period. The analyzer detects a change in the road network, based on a degree of change between traffic amounts in two different periods with respect to the specified section included in the road network and a degree of change between discontinuity rates in the two different periods. The detected change in the road network can be used for survey of the road network.

12 Claims, 14 Drawing Sheets

(56) References Cited

U.S. PATENT DOCUMENTS

| | | | |
|---|---|---|---|
| 2010/0250127 A1* | 9/2010 | Hilbrandie | G01C 21/32 701/533 |
| 2012/0023057 A1 | 1/2012 | Winberry et al. | |
| 2013/0328698 A1* | 12/2013 | Ramachandran | G08G 1/0112 340/905 |
| 2015/0094948 A1* | 4/2015 | Lu | G01C 21/3461 701/410 |
| 2015/0228188 A1* | 8/2015 | Macfarlane | G08G 1/0129 340/936 |
| 2016/0014252 A1* | 1/2016 | Biderman | B60L 15/20 455/420 |
| 2016/0027300 A1* | 1/2016 | Raamot | G08G 1/08 340/922 |

FOREIGN PATENT DOCUMENTS

| | | |
|---|---|---|
| JP | 2009-26103 | 2/2009 |
| JP | 2011-99873 | 5/2011 |
| JP | 2012-514198 | 6/2012 |
| JP | 2012-150016 | 8/2012 |

* cited by examiner

STRUCTURE OF PROBE INFORMATION

| PACKET HEADER | PROBE ID | LINK ID | TIME (YEAR, MONTH, DATE) | (USER ID) |
|---|---|---|---|---|

Fig.6

| LINK NUMBER | YEAR, MONTH, DATE | | | |
|---|---|---|---|---|
| | DATE A | DATE B | DATE C | DATE D |
| 1 | TRAFFIC AMOUNT 1A | TRAFFIC AMOUNT 1B | TRAFFIC AMOUNT 1C | ... |
| 2 | TRAFFIC AMOUNT 2A | TRAFFIC AMOUNT 2B | TRAFFIC AMOUNT 2C | ... |
| 3 | TRAFFIC AMOUNT 3A | TRAFFIC AMOUNT 3B | TRAFFIC AMOUNT 3C | ... |
| 4 | TRAFFIC AMOUNT 4A | TRAFFIC AMOUNT 4B | TRAFFIC AMOUNT 4C | ... |
| 5 | TRAFFIC AMOUNT 5A | TRAFFIC AMOUNT 5B | TRAFFIC AMOUNT 5C | ... |
| 6 | TRAFFIC AMOUNT 6A | TRAFFIC AMOUNT 6B | TRAFFIC AMOUNT 6C | ... |
| 7 | TRAFFIC AMOUNT 7A | TRAFFIC AMOUNT 7B | TRAFFIC AMOUNT 7C | ... |
| 8 | TRAFFIC AMOUNT 8A | TRAFFIC AMOUNT 8B | TRAFFIC AMOUNT 8C | ... |
| 9 | TRAFFIC AMOUNT 9A | TRAFFIC AMOUNT 9B | TRAFFIC AMOUNT 9C | ... |
| 10 | TRAFFIC AMOUNT 10A | TRAFFIC AMOUNT 10B | TRAFFIC AMOUNT 10C | ... |
| 11 | TRAFFIC AMOUNT 11A | TRAFFIC AMOUNT 11B | TRAFFIC AMOUNT 11C | ... |
| 12 | TRAFFIC AMOUNT 12A | TRAFFIC AMOUNT 12B | TRAFFIC AMOUNT 12C | ... |
| . | . | . | . | . |
| . | . | . | . | . |
| . | . | . | . | . |

Fig.7

|  | TIME | | | | |
|---|---|---|---|---|---|
|  | T1 | T2 | T3 | T4 | T5 |
| LINK EXAMPLE 1 | L1 | L2 | L2 | L5 | L6 |
|  |  |  |  |  |  |
| LINK EXAMPLE 2 | L1 | L2 | L4 | L6 |  |
|  |  |  |  |  |  |

Fig.13

|  | PERIOD 1 | PERIOD 2 | ENTIRE PERIOD |
|---|---|---|---|
| PRESENCE OF JUMP INCIDENT | DATA e | DATA g | DATA c |
| ABSENCE OF JUMP INCIDENT | DATA f | DATA h | DATA d |
| TOTAL TRAFFIC AMOUNT | DATA a | DATA b | DATA n |

|  | PERIOD 1 | PERIOD 2 | ENTIRE PERIOD |
|---|---|---|---|
| PRESENCE OF JUMP INCIDENT | 5 | 7 | 12 |
| ABSENCE OF JUMP INCIDENT | 14 | 24 | 38 |
| TOTAL TRAFFIC AMOUNT | 19 | 31 | 50 |

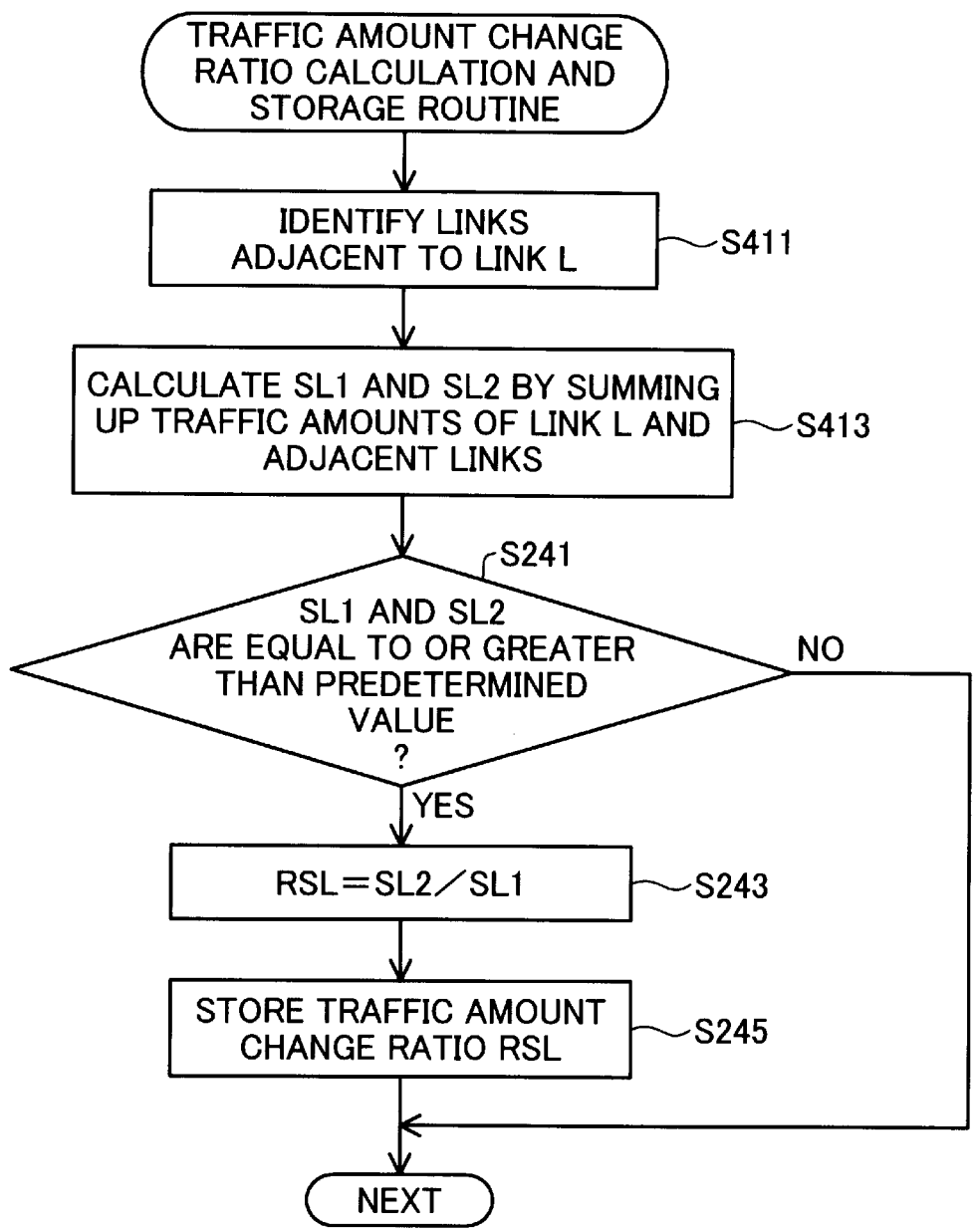

ROAD DETECTION LOGIC

CROSS REFERENCE TO RELATED APPLICATIONS

The present application claims priority from Japanese application JP-A-2013-24084 filed on Feb. 12, 2013, the content of which is hereby incorporated by reference into this application.

TECHNICAL FIELD

The present invention relates to technology of road network analysis to analyze a change in road network.

BACKGROUND ART

The conditions of roads which vehicles pass through are changed by, for example, opening of a new expressway or a new bypass road or closing a road by construction or a disaster. It is necessary to reflect such opening and closing of roads on map data as quickly as possible. Especially with the recent spread of navigation systems including car navigation systems, earlier update of map data has been highly demanded.

Various techniques have been proposed to detect a change of the road conditions by using information sent from vehicles called probe cars which actually run through roads and enable earlier update of road network data. For example, when a plurality of probe cars (vehicles) pass through a location which has been unregistered as a road, one proposed technique registers the location in a map database, in order to enable earlier reflection of a change in road network on the map database (e.g., JP H09-243391A).

This proposed technique, however, registers the location which has been unregistered as a road in the map database, based on the frequency when probe cars pass through. This technique does not identify the importance of a change of the road conditions, especially the significance of influence on road users. It is impossible to obtain all pieces of information which are to be registered in the map database, from only the information sent from probe cars. Generally investigators are dispatched for survey and registration of detailed data. There is accordingly a demand that surveys on changes of the road conditions are made in order of importance. The prior art technique cannot, however, meet this demand.

A proposed road network analysis system (e.g., JP 2012-150016A) is the excellent technique that processes probe information obtained from, for example, probe cars and extracts a change in traffic amount to find an important change in road network as early as possible. A change in traffic amount is, however, also caused by, for example, opening or closing of a large commercial facility. Further improvement of the detection accuracy is accordingly demanded.

SUMMARY OF INVENTION

In order to solve at least part of the problems described above, the invention is implemented by the following aspect.

(1) According to one aspect, there is provided a road network analyzer. This road network analyzer analyzes a change in road network by using probe information generated with driving of a vehicle and includes a traffic amount calculator, a discontinuity rate calculator and a detector. The traffic amount calculator may be configured to determine a traffic amount of vehicles passing through a specified section included in the road network from a plurality of the probe information accumulated over a predetermined period. The discontinuity rate calculator may be configured to determine a discontinuity rate, which is a rate of incidents that vehicle locations are discontinuous in the specified section, from the plurality of probe information accumulated over the predetermined period. The detector may be configured to detect a change in the road network, based on a degree of change between traffic amounts in two different periods with respect to the specified section included in the road network and a degree of change between discontinuity rates in the two different periods.

The road network analyzer according to this aspect detects a change in the road network, based on the degree of change between the traffic amounts in the two different periods and the degree of change between the discontinuity rates in the two different periods. This enables a change in the road network to be accurately detected. More specifically, this suppresses a change in traffic amount caused by opening or closing a facility in a neighborhood of the road, such as a large commercial facility, from being falsely attributed to a change in the road network. This accordingly enables the necessity of field survey to be more adequately determined.

(2) In the road network analyzer according to the above aspect, the discontinuity rate calculator may check the probe information against road network data of the road network and determine whether an incident that the vehicle locations are discontinuous occurs, so as to determine the discontinuity rate. When information regarding a change in vehicle location with time is included in the probe information, it can be readily determined whether an incident that the vehicle locations are discontinuous occurs by using this information. When information indicating whether an incident that the vehicle locations are discontinuous occurs is included in the probe information generated with driving of the vehicle, it may be determined whether an incident that the vehicle locations are discontinuous occurs, based on only the probe information. This probe information may be generated on the vehicle or on a device that relays probe information.

(3) In the road network analyzer according to the above aspect, the road network data of the road network may include links corresponding to roads and nodes representing ends of the links. A specified part of the road network data may include at least one of the links and a node representing at least one end of the link. The probe information may include information of identifying a link or a node where the vehicle has passed through. The traffic amount may be number of vehicles which have passed through the link or the node included in the specified part. The discontinuity rate may be a ratio of number of vehicles which have passed through a link or a node specified as discontinuous to the traffic amount. The road network analyzer of this aspect can readily detect a change in the road network by expressing the road network in the form of links and nodes. The concept of such analysis of the road network is, however, also applicable to the road network expressed in a different form other than the form of links and nodes.

(4) The road network analyzer according to the above aspect may further comprise a probe information acquirer configured to obtain the probe information sent from the vehicle. The road network analyzer may directly obtain probe information from probe vehicles. In another application, probe information sent from probe vehicles are once accumulated in, for example, a dedicated server, and the road network analyzer may obtain the probe information accumulated in this server to analyze the road network. Directly obtaining probe information sent from probe vehicles enables real-time analysis of the road network. Analyzing data stored in the server, on the other hand, enables collective processing at regular intervals and facilitates scheduling for processing and elimination of a seasonal variation.

(5) In the road network analyzer according to the above aspect, the degree of change between the traffic amounts in the two different periods with respect to the specified section included in the road network may be a ratio of the traffic amount in one of the two periods to the traffic amount in the other of the two periods. The traffic amount varies from day to day, from week to weak and from season to season. In some cases, it is preferable to provide the degree of change of the traffic amount as an increase rate or a decrease rate from the traffic amount in one of the two periods. The ratio of the traffic amount may be calculated as a difference between the ratios of the traffic amounts in the respective periods to the total traffic amount in the two periods.

(6) In the road network analyzer according to the above aspect, the degree of change between the discontinuity rates in the two different periods may be a difference by subtracting the discontinuity rate in one of the two periods from the discontinuity rate in the other of the two periods. In some cases, a change of the discontinuity rate is easily understandable by providing the degree of change of the discontinuity rate as a difference between the discontinuity rates. Alternatively the degree of change of the discontinuity rate may be provided as a ratio of the discontinuity rate in one of the two periods to the discontinuity rate in the other of the two periods.

(7) In the road network analyzer according to the above aspect, the detector may detect a change in the specific section of the road network when a deviation of the ratio of the traffic amount from a steady-state value is equal to or greater than a predetermined level and when a deviation of the difference of the discontinuity rate from a steady-state value is equal to or greater than a predetermined level. The road network analyzer of this aspect detects a change in the specific section of the road network when both the ratio of the traffic amount and the difference of the discontinuity rate are deviated from their stead-state values by the predetermined values or greater. This suppresses a change of the traffic amount caused by a different reason other than a change in the road network from being falsely attributed to a change in the road network. For example, the traffic amount in a predetermined district may be significantly varied by opening or closing of a large commercial facility. In these cases, the discontinuity rate is not generally changed, so that this change of the traffic amount is unlikely to be falsely attributed to a change in the road network.

(8) In the road network analyzer according to the above aspect, the deviation of the ratio of the traffic amount from the steady-state value may be evaluated by a deviation from a binomial distribution. A change in traffic amount between the two periods can be regarded as an either- or choice between an increase of the traffic amount in one period from the other period and a decrease of the traffic amount in one period from the other period. Unless the road network has a change, it is considered that whether the traffic amount in one period is increased (or decreased) from the traffic amount in the other period is a stochastic matter. In this case, when a number of data are obtained with regard to the specified section of the road network, the ratio of the traffic amount with respect to the specified section of the road network is expected to follow a binomial distribution. A deviation of the ratio of the traffic amount from its steady-state value is thus readily detectable by the deviation from this distribution. In the case that an extremely large number of sample data are obtained, the binomial distribution can be approximated by a normal distribution.

(9) In the road network analyzer according to the above aspect, the degree of change of the discontinuity rate may be evaluated by Fisher's probability test. The Fisher's probability test is the technique that mathematically verifies whether a null hypothesis (in this case, the discontinuity rate in one period does not substantially differ from the discontinuity rate in the other period with respect to the specified section of the road network) is satisfied. This enables the degree of change of the discontinuity rate to be estimated with mathematical rigor. Another procedure may make a comparison between the discontinuity rates in the two periods and determines whether the discontinuity rate in one period is greater than the discontinuity rate in the other period. In this application, the degree of change of the discontinuity rate may be evaluated by a binomial distribution, like the change of the traffic amount.

(10) According to a second aspect, there is provided a road network analysis system. This road network analysis system may include: a probe vehicle configured to generate probe information with driving of the vehicle; and an analyzer configured to receive the probe information from the probe vehicle and analyze a road network. The probe vehicle may comprise a transmitter configured to refer to link-node information correlated to the road network and send information of a link and/or a node which the probe vehicle has passed as part of the probe information. The analyzer may comprise a probe information accumulator, a calculator, an extractor and a detector. The probe information accumulator may be configured to receive the probe information sent from a plurality of the probe vehicles and accumulate the received probe information over a predetermined period. The calculator may be configured to determine a traffic amount of vehicles passing through links and/or nodes of a specified section included in the road network from a plurality of the probe information accumulated over the predetermined period and to determine a discontinuity rate, which is a rate of incidents that vehicle locations are discontinuous in the specified section, from the plurality of probe information accumulated over the predetermined period. The extractor may be configured to extract a degree of change between traffic amounts in two different periods with respect to the specified section included in the road network and a degree of change between discontinuity rates in the two different periods. The detector may be configured to detect a change in the road network, based on the extracted degree of change of the traffic amount and the extracted degree of change of the discontinuity rate.

The road network analysis system according to this aspect detects a change in the road network, based on the degree of change between the traffic amounts in the two different periods and the degree of change between the discontinuity rates in the two different periods. This enables a change in the road network to be accurately detected. More specifically, this suppresses a change in traffic amount caused by opening or closing a facility in a neighborhood of the road, such as a large commercial facility, from being falsely attributed to a change in the road network. This accordingly enables the necessity of field survey to be more adequately determined.

The plurality of structural components included in each aspect of the invention described above are not all essential, but some structural components among the plurality of structural components may be appropriately changed, omitted or replaced with other structural components or part of the limitations may be deleted, in order to solve part or all of the problems described above or in order to achieve part or all of the advantageous effects described herein. In order to solve part or all of the problems described above or in order to achieve part or all of the advantageous effects described herein, part or all of the technical features included in one aspect of the invention described above may be combined with part or all of the technical features included in another aspect of the invention described above to provide still another independent aspect of the invention.

The invention may also be implemented by other various applications, for example, a road network analysis method of analyzing a change in road network by using probe information generated with driving of a vehicle, a program that is readable by a computer and causes the computer to perform a process of analyzing a change in road network by using probe information generated with driving of a vehicle, and a non-transitory storage media in which such a computer program is stored.

BRIEF DESCRIPTION OF DRAWINGS

FIG. 6 is a diagram showing one example of traffic amount data;

FIG. 7 is a diagram showing arrays of links with or without a jump incident;

FIG. 13 is a diagram showing the concept of Fisher's probability test;

FIG. 15 is a flowchart showing a traffic amount change ratio calculation and storage routine according to a third embodiment.

DESCRIPTION OF EMBODIMENTS

A. Outline of Embodiment

Figures 1, 2:
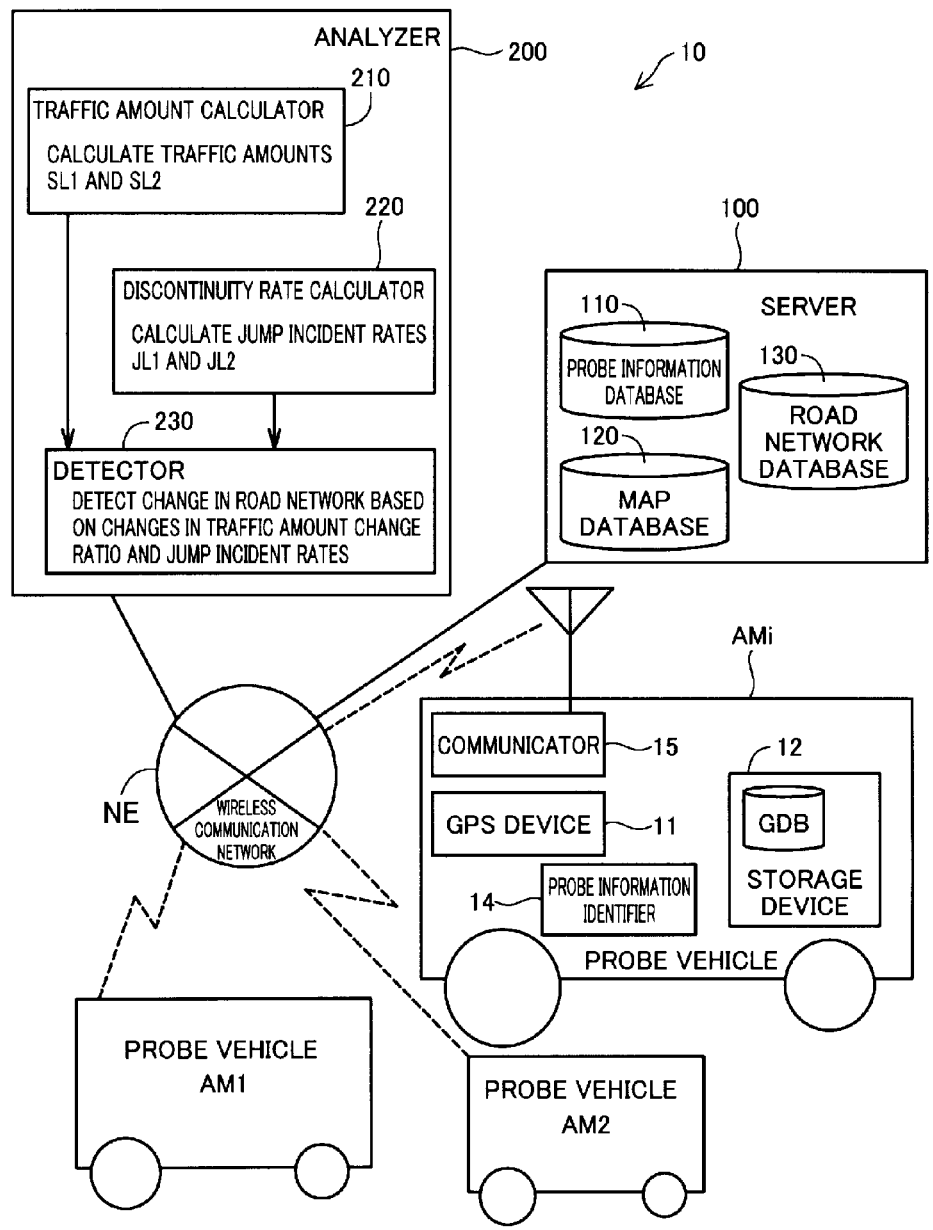
FIG. 1 is a block diagram illustrating the general configuration of a road network analysis system according to a first embodiment.
FIG. 2 is a diagram showing one example of probe information.

An embodiment of the invention is described. FIG. 1 is a block diagram illustrating the general configuration of a road network analysis system 10 according to one embodiment of the invention. A illustrated, this road network analysis system 10 includes n probe vehicles AM1, AM2, . . . , AMn, a server 100 configured to receive probe information from these probe vehicles and an analyzer 200 configured to analyze a road network. In the description hereof, the probe vehicles AM1, AM2, . . . , AMn are collectively called probe vehicle AMi unless individual discrimination is required. The state that the vehicle runs on a specific location such as road or link is expressed by the wording "pass" or "traffic" in principle, and the state that the vehicle simply runs is expressed by the wording "drive" in principle.

The details of the embodiment are sequentially described below. For the better understanding of the embodiment, the processes of the respective components corresponding to claim 1 in CLAIMS are described first as the functions of the analyzer 200. The analyzer 200 includes a traffic amount calculator 210, a discontinuity rate calculator 220 and a detector 230. The analyzer 200 or specifically its traffic amount calculator 210 determines traffic amounts SL1 and SL2 of the probe vehicles in respective two periods 1 and 2 with regard to each link, based on the probe information from the probe vehicles AMi. The two periods may be, for example, the first half and the second half of a fiscal year or last month and this month.

The analyzer 200 or specifically its discontinuity rate calculator 220 determines jump incident rates JL1 and JL2 in the respective two periods 1 and 2. The jump incident rate means the rate of the number of jump incidents where the probe vehicle AMi passes through discontinuous links to the total traffic amount (the details will be described later).

Additionally, the analyzer 200 or specifically its detector 230 detects a change in the road network. This detection is performed by the following procedure. The procedure first calculates a traffic amount change ratio RSL with respect to each link by RSL=SL2/SL1. The procedure then performs tests of this traffic amount change ratio RSL and the jump incident rates JL1 and JL2 and detects a change in the road network with respect to the link when the test results indicate significant changes.

The embodiment of the invention accordingly detects a change in the road network by performing the tests of the traffic amount change ratio RSL and the jump incident rates JL1 and JL2 with respect to each link. This enables highly accurate detection of a change in the road network. This procedure suppresses a simple change of the traffic amount, for example, caused by opening a new large commercial facility, from being falsely attributed to a change in the road network. This procedure also reduces misdetection caused by a failure of the probe vehicle or deficiency of link data. The following describes some aspects of the invention in detail with reference to first to third embodiments and a number of modifications.

B. System Configuration

The probe vehicle AMi includes a GPS device 11 configured to detect the location of the vehicle, a storage device 12 configured to store map database GDB, a probe information identifier 14 configured to identify a link on the road database GDB from the detected vehicle location and a communicator 15 configured to make communication including transmission of probe information. The probe vehicle AMi may further be equipped with a navigation device using the map database GDB. In this application, the storage device 12, the probe information identifier 14 and the communicator 15 may be incorporated as part of the navigation device.

The map database GDB is a database that stores link-node information corresponding to an actual road network. Nodes are set corresponding to locations having different vehicle traffic conditions, such as intersections, bifurcations and starting points of one-way streets, and links are set to interconnect these nodes. In general, as the probe vehicle AMi passes through roads, the probe vehicle AMi sequentially follows links connected by the nodes on the map database GDB.

The probe vehicle AMi identifies a link corresponding to the road where the probe vehicle AMI passes through by referring to the map database GDP, based on the vehicle location (latitude longitude information) obtained from the GPS device 11 and sends the identified link as probe information at predetermined intervals via the communicator 15. FIG. 2 illustrates one example of probe information PIi output from the probe vehicle AMi. The probe information PIi is sent in the form of a packet having a packet header. The packet includes data of a probe ID, a link ID and time (date and time). The probe ID is a unique number used to identify the probe vehicle AMi from which the probe information is sent. The link ID is a unique number used to identify a link corresponding to the road where the probe vehicle AMi passes through. The time is data enabling identification of the year, the month and the date according to this embodiment. The time data may alternatively be more detailed data, such as the hour, the minute and the second obtained from GPS. The probe information PIi may additionally include another piece of information such as a user ID shown in parentheses in FIG. 2. The brackets in FIG. 2 show the items are optional. For example, different users may drive one identical probe vehicle AMi, so that the user ID is used to identify the driving user. The probe information may further include the driving speed of the probe vehicle AMi and information regarding the driving operations of, for example, an accelerator, a brake and a steering wheel.

The probe information PIi sent from the probe vehicle AMi is collected to the server 100 via a wireless communication network NE. The technique of sending the probe information is known in the art and is not described in detail; the probe information PIi may be sent in the form of a packet by, for example, TCP/IP protocol. The sent packet is forwarded to a wide area communication network such as the Internet via the wireless communication network and is delivered to the server 100 based on the IP address assigned in the header. Various settings are allowed for the timing of sending probe information from the probe vehicle AMi to the sever 100. According to this embodiment, in order to collect the effective information for analysis, the probe information is sent at predetermined intervals from the probe vehicle AMi which is driven at a specified or higher speed. Alternatively the probe information may be sent when the vehicle location moves from a certain link to another link stored in the map database GDB. According to another embodiment, the probe vehicle AMi may not have the map database GDP and send the location information obtained from the GPS device 11 at predetermined intervals. The server 100 or the analyzer 200 described below may identify a link or a node where the probe vehicle AMi is located.

The server 100 includes a probe information database 110, a map database 120 and a road network database 130. The map database 120 stores polygon data for drawing a map. The map database 120 is used to display the result of analysis with a map in the analyzer 200. The road network database 130 stores road network data showing a road network consisting of roads and intersections expressed in the form of links and nodes. The road network data is usable for route search. The road network data additionally include information regarding the road type such as national road or prefectural road, the road width such as the number of lanes, the travelling direction restriction such as right turn and left turn prohibition and the traffic restriction such as one-way traffic, with respect to the respective links and nodes. This road network database 130 may be identical with the map database GDB mounted on the probe vehicle AMi.

The probe information database 110 is a database recording the traffic trace of the probe vehicle AMi in time series. The server 100 stores the probe information PIi sent from each probe vehicle AMi into the probe information database 110. The probe information database 110 stores at least the probe ID for identifying the vehicle AMi, the link ID and the time. When the information uploaded from the probe vehicle AMi includes the user ID, the detailed time data, the driving speed of the probe vehicle AMi and the information regarding the driving operations of an accelerator, a brake and a steering wheel, these pieces of information may additionally be stored in the probe information database 110.

The server 100 stores probe information from a plurality of probe vehicles AMi over a predetermined time period in the probe information database 110. The probe information is sent from the probe vehicle AMi at the intervals of once ss seconds. On the assumption that n probe vehicles AMi are present on a road network as the target of analysis and are driven for an average of hh hours per day and that the volume of each probe information is 10 bytes, the data volume for one year is: $10 \times n \times (hh \times 3600/ss) \times 365$ bytes. The probe information database 100 has a capacity sufficient for storing such data volume. On the assumption that there are 100 thousand probe vehicles AMi, the interval is 4 seconds and the average driving time per day is 4 hours, the data volume: $10 \times 100000 \times (4 \times 3600/4) \times 365$ is about 1.3 terabytes.

Figure 3:
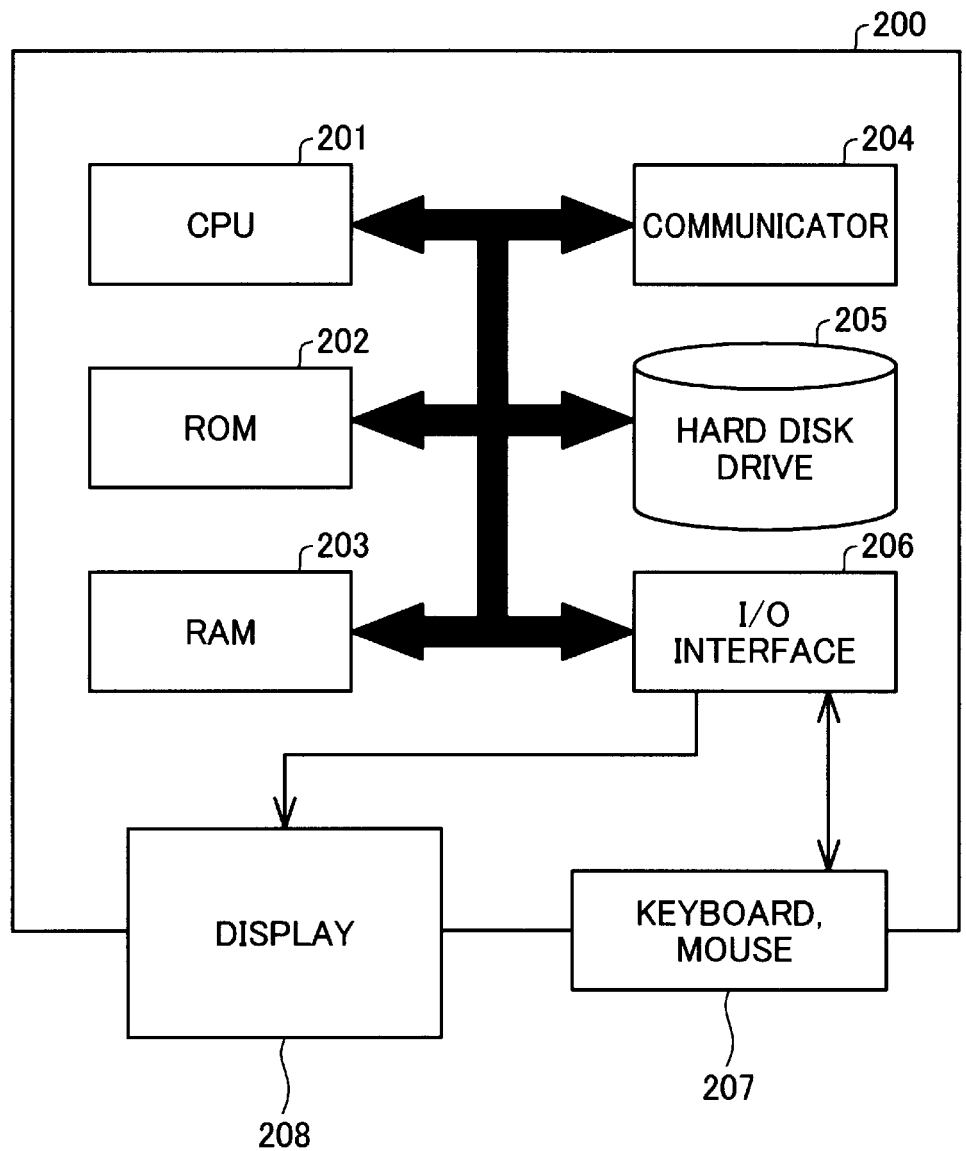
FIG. 3 is a block diagram illustrating the general configuration of an analyzer.

The analyzer 200 uses this probe information stored in the server 100 to analyze the road network. The functions implemented by the analyzer 200 are described previously. This analyzer 200 is actually provided as a computer including a CPU 201, a ROM 202, a RAM 203, a communicator 204, a hard disk drive 205, an I/O interface 206, a keyboard and mouse 207, and a display 208 as shown in FIG. 3. The functions of, for example, the traffic amount calculator 210 described above are implemented by execution of a computer program stored in the hard disk drive 205 under a predetermined OS installed in the analyzer 200. Alternatively part or all of the functions may be implemented by discrete hardware (e.g., circuit). Like the analyzer 200, the server 100 is also provided as a computer including a CPU and performs management of the respective databases and writing and reading operations by execution of a computer program.

C. Process of Collecting Traffic Amount Data

Figure 4:
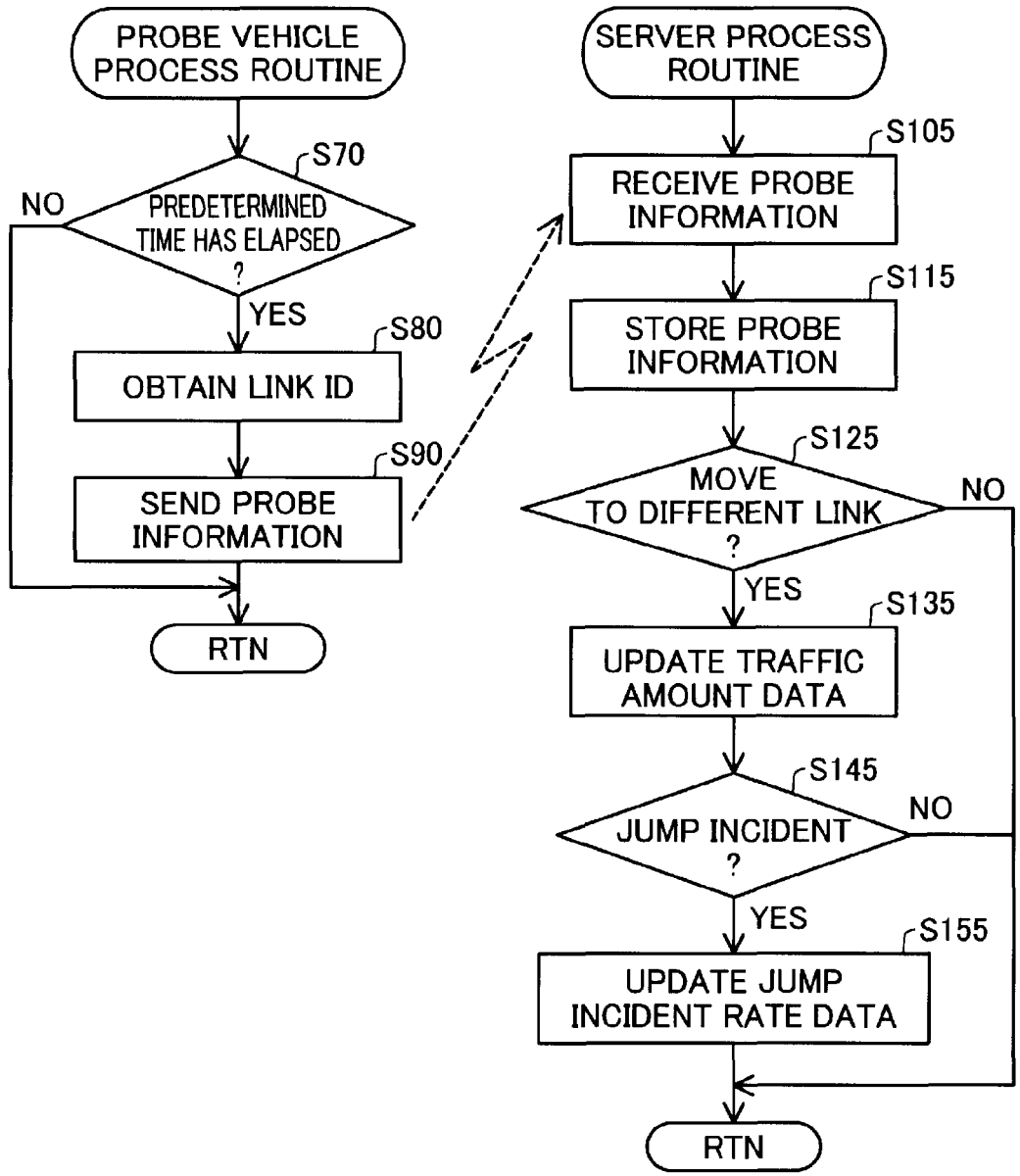
FIG. 4 is a flowchart showing processing flows by a probe vehicle and a server.

The following describes a process of collecting traffic amount data among the operations of the road network analysis system 10. FIG. 4 is a flowchart showing processes performed by the probe vehicle AMi and the sever 100 among the probe vehicle AMi, the server 100 and the analyzer 200 constituting the road network analysis system 10. Steps S70 to S90 on the left side of illustration show a probe vehicle process routine executed continually by the probe vehicle AMi during driving, and steps S105 to S155 on the right side show a server process routine executed continually by the server 100.

After a start of driving, the probe vehicle AMi obtains a link ID (step S80) every time a predetermined time has elapsed (step S70). The procedure of obtaining the link ID obtains the vehicle location from the GPS device 11 and checks the vehicle location against the link-node information stored in the map database GDP of the storage device 12. In other words, the link ID obtained at step S80 is used to identify a link corresponding to the road where the probe vehicle AMi currently passes through.

Figure 5:
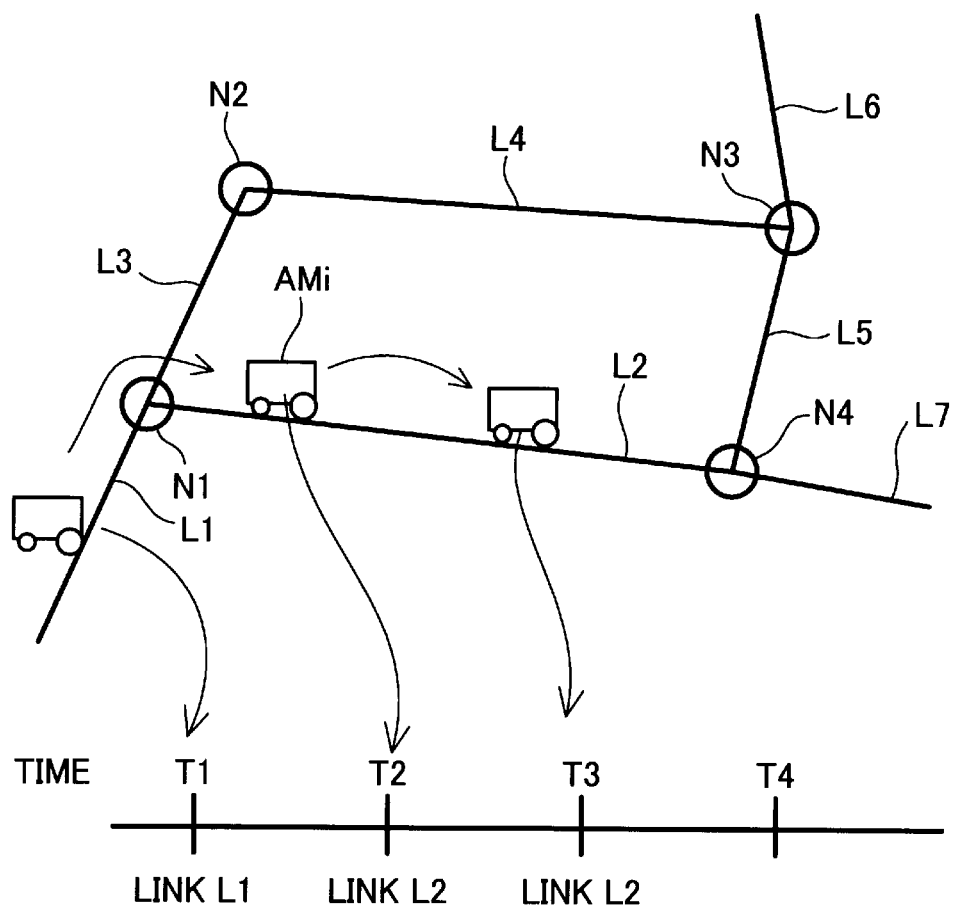
FIG. 5 is a diagram showing one example of links and nodes.

FIG. 5 is a diagram schematically illustrating a link-node relationship. The illustrated example of FIG. 5 includes links L1 to L7 corresponding to roads and nodes N1 to N4 for connecting these links L1 to L7. Such a link-node relationship is stored in the road network database 130 of the server 100 to describe an actual road configuration. It is assumed that the probe vehicle AMi passes through the link L1 at a time T1, subsequently passes through the node N1 and passes through the link L2 at a time T2 after a predetermined interval. In this case, L1 is obtained as the link ID at the time T1 and L2 is obtained as the link ID at the time T2. In the description below, the link L1 is expressed by a link number 1 and the link L2 is expressed by a link number 2.

When obtaining the current link ID, the probe vehicle AMi organizes this link ID in the form of probe information shown in FIG. 2 and sends the probe information on the wireless communication network NE (step S90). After that, the probe vehicle AMi goes to "RTN" and terminates the probe vehicle process routine. The sent probe information is delivered in the form of a packet from the wireless communication network NE across a non-illustrated wide area communication network such as the Internet to the server 100. It is possible that the probe vehicle AMi still passes through the same link L2 at a time T3 after the predetermined interval from the time T1. In this case, the probe vehicle AMi sends probe information including the same link L2.

The sever 100 receives this probe information via the network (step S105) and stores this probe information into the probe information database 110 (step S115). Accordingly, data showing an array of link IDs where the probe vehicle AMi successively passes through, with time T1 is stored in part of the probe information database 110. The server 100 subsequently determines whether the probe vehicle AMi moves to a different link (step S125). When it is determined that the probe vehicle AMi does not move to a different link or still passes through the same link L2 (step S125: NO) as in a time period between the time T2 and the time T3, the server 100 goes to "RTN" and terminates the server process routine without any further processing after storage of the probe information.

When it is determined that the probe vehicle AMi moves to a different link (step S125: YES), on the other hand, the server 100 updates traffic amount data (step S135). The traffic amount data is stored in the probe information database 110 of the server 100. An example of traffic amount data is shown in FIG. 6. The traffic amount data is data recorded with respect to all the links in the unit of a day and is incremented by a value 1 when the probe vehicle AMi passes through the road corresponding to a link one time. For example, when the probe vehicle AMi is located on the link L2 at a time T2 of a date A and is determined to move from the previous link L1 to the link L2, a traffic amount 1A is incremented by one. The traffic amount of a link on a date is incremented, when another probe vehicle AMi passes through the link as well as when the same probe vehicle AMi passes through the same link a plurality of times on the same date. In the illustrated example of FIG. 6, the traffic amount data is stored in the unit of a day. The unit of recording data may, however, be half a day or a shorter unit like every hour. Data may alternatively be recorded in the unit of two days, one week or one month. The longer unit of recording may be employed for the roads of small traffic volume, and the shorter unit of recording may be employed for the roads of large traffic volume. The total number of probe vehicles AMi passing through each road (i e, link) is recorded in this manner with respect to each link number and with respect to each date.

The server 100 subsequently detects the presence or the absence of a jump incident (step S145). Detecting the presence or the absence of a jump incident depends on determination of whether the link IDs are continuous or discontinuous by checking the link IDs included in the probe information sent from the probe vehicle AMi against the road network data stored in the road network database 130. FIG. 7 is a diagram explaining a jump incident. When the probe vehicle AMi passes through the roads illustrated in FIG. 5, the probe vehicle AMi obtains the link ID at the short intervals of several seconds. As long as the probe vehicle AMi moves along the links, it is thus unlikely to fail in obtaining the link ID of each link where the probe vehicle AMi passes through. Usually link IDs are continuous shown by Link Example 1 in FIG. 7 as:

L1-->L2-->L2-->L5-->L6.

Although the link information does not include nodes, this array is expressed by addition of nodes N in brackets as:

L1-->(N1)-->L2-->L2, -->(N4)-->L5-->(N3)-->L6.

This link information is stored in the road network database 130 of the sever 100.

Link IDs obtained from the probe vehicle AMi and arranged in times series may be discontinuous like an array of L1, L2, L4 and L6 shown by Link Example 2 in FIG. 7. This array is expressed as:

L1, -->(N1)-->L2-->(x)-->L4, -->(N3)-->L6 by addition of nodes N in brackets. A node is generally present between different link IDs. In this example, however, no node is found to connect the link L2 with the link L4, based on the road network data in the road network database 130. This phenomenon is called a jump incident of links. Since the link L2 and the link L4 are discontinuous on the road network database 130, the presence of a jump incident is detected (step S145: YES) in the case of a movement from the link L2 to the link L4. The server 100 then updates jump incident rate data (step S155). The jump incident rate data is data recorded with respect to each link number and with respect to each data as in the case of FIG. 6. After the processing of step S155 or upon detection of the absence of a jump incident (step S145: NO), the server 100 goes to "RTN" and terminates the server process routine shown in FIG. 4.

According to this embodiment, when sequentially obtained link IDs are discontinuous, the occurrence of a jump incident is counted with respect to both the links and is recorded at step S155 irrespective of the driving direction. Upon detection of discontinuous links included in the probe information, the jump incident rate is updated for the following links:

1) a former link in the case that the probe information including discontinuous links is sent from a vehicle passing through the links in one direction (upbound);
2) a latter link in the case that the probe information including discontinuous links is sent from the vehicle passing through the links in one direction (upbound);
3) a former link in the case that the probe information including discontinuous links is sent from a vehicle passing through the links in the opposite direction (downbound); and
4) a latter link in the case that the probe information including discontinuous links is sent from the vehicle passing through the links in the opposite direction (downbound). The jump incident rate should be originally understood as the rate of the number of jump incidents to the total traffic amount. A concrete procedure should thus determine the traffic amount of probe vehicles with respect to each link in the above cases 1) to 4) and divide the number of jump incidents by the corresponding traffic amount to calculate the jump incident rate. This embodiment, however, employs the Fisher's probability test for evaluation of the changes in jump incident rates as described later and thus directly counts the number of jump incidents, which is called "jump incident rate" as a matter of convenience. The procedure of using the calculated jump incident rate will be described later as a modification. The unit of detecting jump incidents is not limited to the above example, but only either the former link or the latter link may be used as the unit of detection. The number of jump incidents may be counted at each link, and the jump incident rate at the link may be calculated from the count. The jump incident rates may be recorded individually for upbound and downbound.

D. Analysis Process

Figure 8:
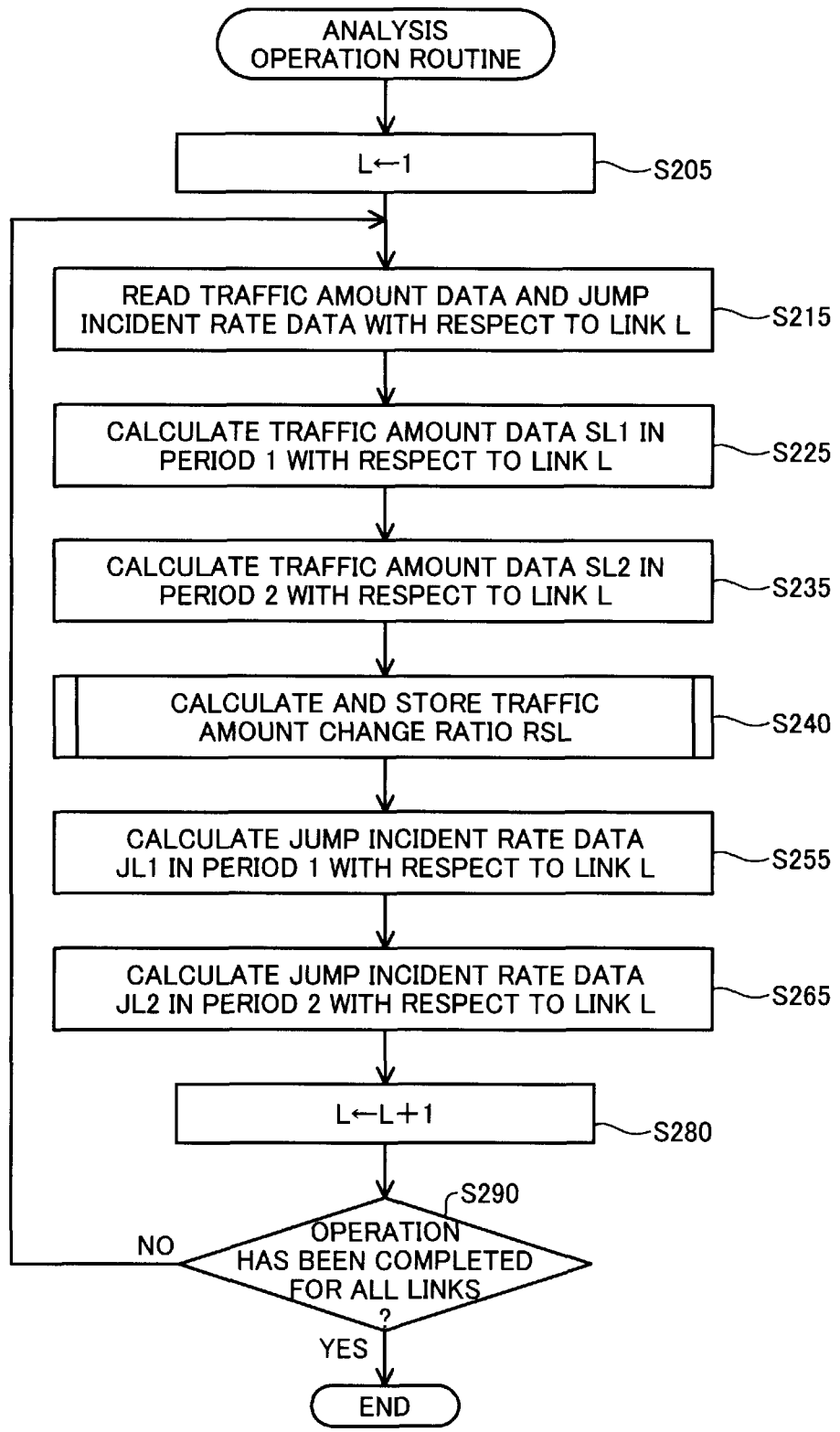
FIG. 8 is a flowchart showing an analysis operation routine performed by the analyzer.
Figure 9:
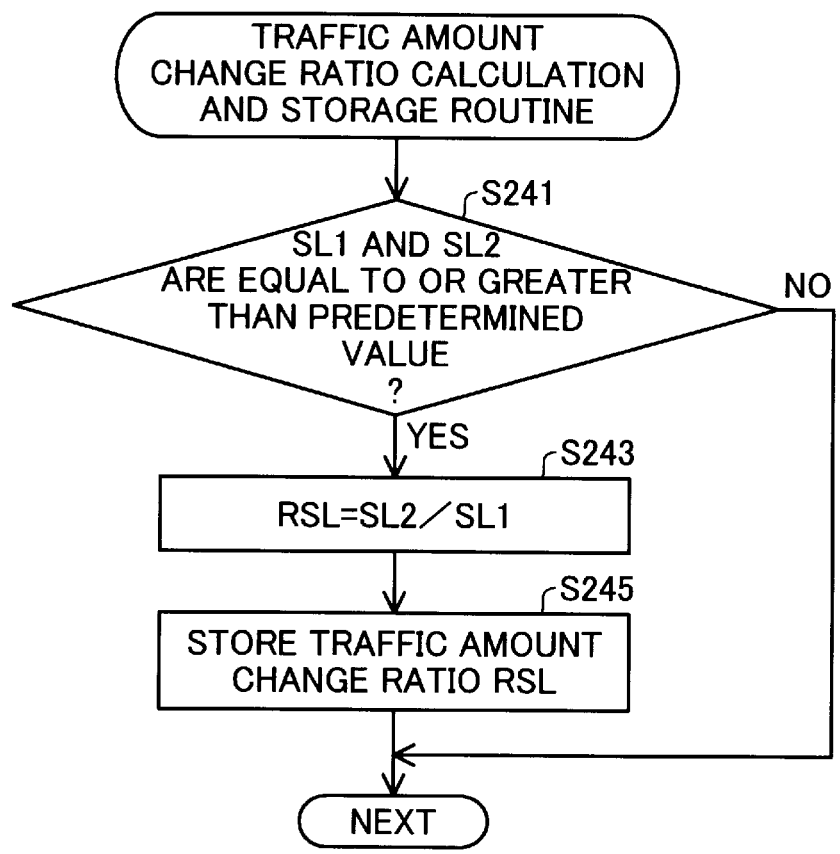
FIG. 9 is a flowchart showing a traffic amount change ratio calculation and storage routine performed by the analyzer.
Figure 10:
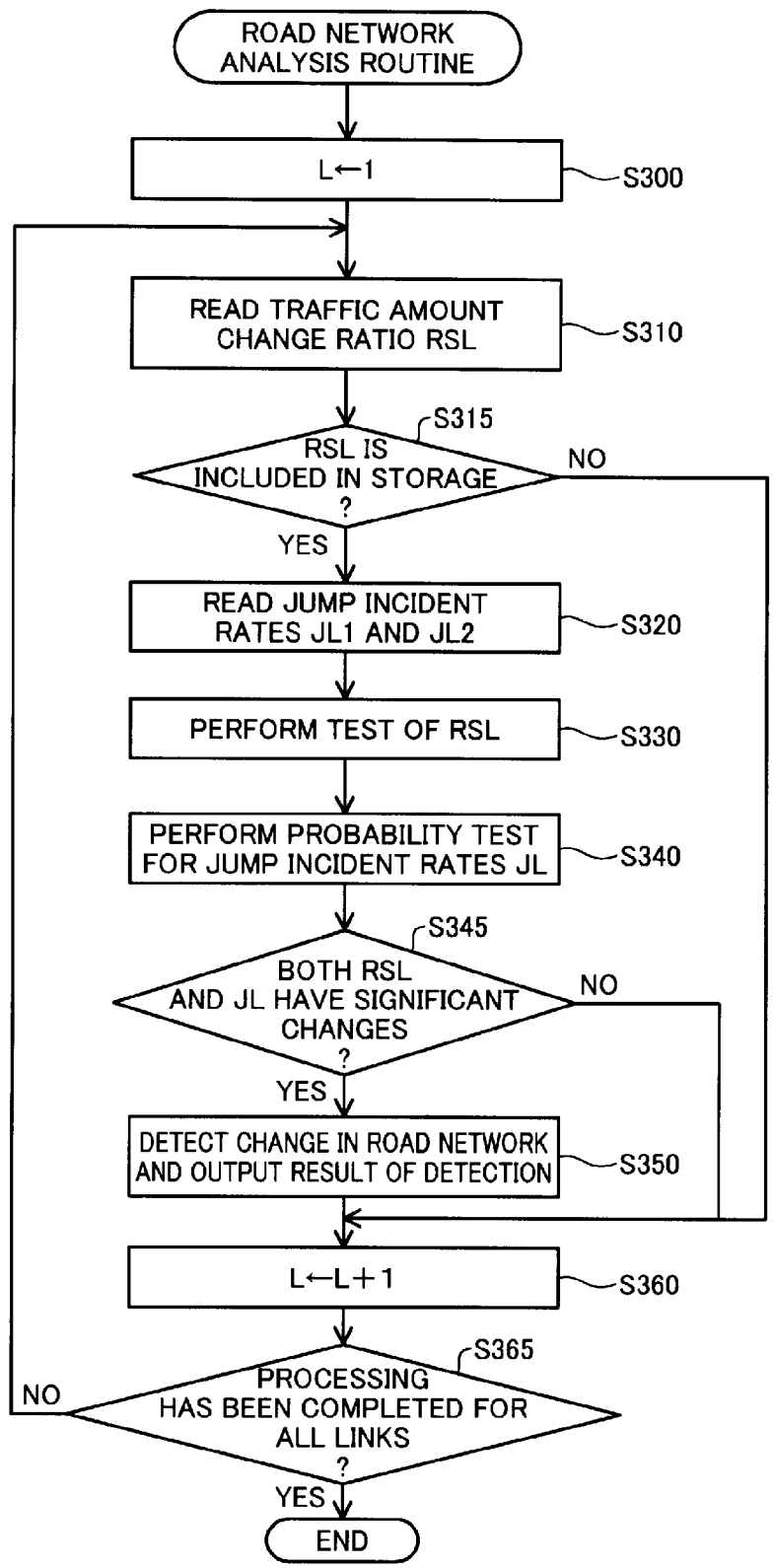
FIG. 10 is a flowchart showing a road network analysis routine performed by the analyzer.

The following describes the analysis process performed by the analyzer 200 with reference to FIGS. 8 to 10. FIG. 8 is a flowchart showing an analysis operation routine as part of the analysis process performed by the analyzer 200. This analysis operation routine is triggered by the user's instruction for analysis of the road network in the analyzer 200. The analysis operation routine may otherwise be automatically activated at regular intervals, for example, every day, every week, every ten days of the month or every month. The analysis operation routine may also be activated when the number of pieces of link information stored in the server 100 or the number of jump incidents reaches or exceeds a predetermined level.

On the start of the process shown in FIG. 8, the analyzer 200 first initializes a variable L representing the link number to a value 1 (step S205) and reads out the traffic amount data (FIG. 6) and the jump incident rate data with respect to the link L from the probe information database 110 of the server 100 (step S215). The analyzer 200 subsequently calculates traffic amount data SL1 in a period 1 with respect to the link L (step S225) and calculates traffic amount data SL2 in a period 2 with respect to the link L (step S235). The traffic amount on each date with respect to the link L (for example, link 1) is recorded in the probe information database 110 of the sever 100. These traffic amounts are integrated in the respective periods 1 and 2. For example, the period 1 may be April to September (first half of the fiscal year) and the period 2 may be October to March (second half of the fiscal year). In another example, the period 1 may be the month before last and the period 2 may be the last month. In yet another example, the period 1 may be the first ten days of the month (1st to 10th) and the period 2 may be the second ten days of the month (11th to 20th). The period 1 and the period 2 may be the same length or may be different lengths.

The analyzer 200 subsequently calculates and stores a traffic amount change ratio RSL (step S240). The traffic amount change ratio RSL is the ratio of the traffic amount in the period 2 to the traffic amount in the period 1. The procedure of calculating the traffic amount change ratio RSL will be described later in detail.

After calculation and storage of the traffic amount change ratio RSL, the analyzer 200 calculates jump incident rate data JL1 in a period 1 with respect to the link L (step S255) and calculates jump incident rate data JL2 in a period 2 with respect to the link L (step S265). The jump incident rate on each date with respect to the link L (for example, link 1) is recorded in the probe information database 110 of the sever 100. These jump incident rates are integrated in the respective periods 1 and 2. These periods 1 and 2 are preferably identical with the periods 1 and 2 used for calculation of the traffic amount data SL1 and SL2 at steps S225 and S235. The processing of steps S215 to S235 and the processing of steps S255 to S265 respectively correspond to the processing of the traffic amount calculator 210 and the processing of the discontinuity rate calculator 220 shown in FIG. 1.

The analyzer 200 then increments the variable L representing the link number by a value 1 (step S280) and determines whether the operation has been completed for all the links (step S290). When the operation has not yet been completed for all the links, the analyzer 200 returns to step S215 and repeats the above series of processing (steps S215 to S290). When the operation has been completed for all the links, on the other hand, the analyzer 200 goes to "END" and terminates this analysis operation routine.

The following describes the details of step S240 (traffic amount change ratio calculation and storage routine) in the analysis operation routine. FIG. 9 is a flowchart showing this traffic amount change ratio calculation and storage routine. In the traffic amount change ratio calculation and storage routine, the analyzer 200 first determines whether the traffic amount data SL1 and SL2 in the periods 1 and 2 with respect to the link L are equal to or greater than a predetermined value (step S241). When the total traffic amounts SL1 and SL2 in the respective periods 1 and 2 with respect to the link specified by the link number L are less than the predetermined value, calculation of the traffic amount change ratio is often meaningless. It is accordingly determined that traffic amount change ratio is not calculated in this case. When the traffic amount data SL1 and SL2 are equal to or greater than the predetermined value (step S241: YES), the analyzer 200 calculates the traffic amount change ratio RSL by Expression (1) (step S243):

$$RSL = SL2/SL1 \qquad (1)$$

The analyzer 200 then stores the traffic amount change ratio RSL in a specified area of the hard disk drive 205 (step S245) and goes to "NEXT" to terminate this traffic amount change ratio calculation and storage routine. When there is a known parameter, such as a seasonal variation parameter, the procedure may correct the traffic amounts by taking into account this parameter and determine the traffic amount change ratio RSL.

The traffic amount change ratio RSL and the jump incident rates JL1 and JL2 are calculated with respect to links having the total traffic amounts SL1 and SL2 in the periods 1 and 2 equal to or greater than the predetermined value among all the links of the link number 1 to the maximum link number by the analysis operation routine (FIG. 8) and the traffic amount change ratio calculation and storage routine (FIG. 9) described above. The results of calculations are stored in correlation to the link number L in the specified area of the hard disk drive 205.

The analyzer 200 subsequently activates a road network analysis routine shown in FIG. 10. This routine may be activated automatically subsequent to the analysis operation routine shown in FIG. 8 or may be activated manually by the user. On the start of the road network analysis routine, the analyzer 200 first initializes a variable L representing the link number to a value 1 (step S300) and reads out the traffic amount change ratio RSL stored in the hard disk drive 205 (step S310). The traffic amount change ratio RSL may be not included in the storage as described above in FIG. 9. The analyzer 200 accordingly determines whether data of the traffic amount change ratio RSL is included in the storage (step S315). When the data of the traffic amount change ratio RSL is included in the storage (step S315: YES), the analyzer 200 additionally reads out the jump incident rates JL1 and JL2 (step S320).

The analyzer 200 then performs a test of the traffic amount change ratio RSL (step S330) and a test of the jump incident rates JL1 and JL2 (step S340). The details of such tests will be described later. The analyzer 200 subsequently determines whether both the traffic amount change ratio RSL and the jump incident rates JL1 and JL2 have significant changes, based on the results of both the tests (step S345). When it is determined that the results of tests indicate significant changes, the analyzer 200 detects a change in the road network and outputs the result of detection to, for example, the display 208 (step S350). After the result of detection is output (step S350), when it is determined that at least one of the traffic amount change ratio RSL and the jump incident rates JL1 and JL2 have no significant change (step S345: NO) or when the traffic amount change ratio RSL is not included in the storage (step S315: NO), the analyzer 200 increments the variable L representing the link number by a value 1 (step S360) and determines whether the processing has been completed for all the links (step S365). When the processing has not yet been completed for all the links, the analyzer 200 goes back to step S310 and repeats the above series of processing (steps S310 to S365). When the processing has been completed for all the links, on the other hand, the analyzer 200 goes to "END" and terminates this road network analysis routine.

The following describes tests of the traffic amount change ratio RSL and the jump incident rates. A test of the traffic amount change ratio RSL (step S330) is performed based on the binomial theorem by the following procedure. When the conditions in the period 2 do not differ from the conditions in the period 1, the probability that the period 1 has the greater traffic amount than the period 2 is 1/2 with respect to each link. The increment of the traffic amount in one of the period 1 and the period 2 relative to the traffic amount in the other period is detected with respect to all links N included in a road network as the target of detection. The distribution of an incident occurring with the probability of 1/2 is then provided as a binomial distribution calculated by the binomial theorem. When the probe vehicles AMi provide an extremely large volume of traffic amount data, the binomial distribution is known to be approximated by a normal distribution. In the case of small traffic volume, the change ratio RSL of the traffic amount in the period 2 to the traffic amount in the period 1 may be deviated from the value 1 to some extent. In the case of large traffic volume, however, the change ratio RSL (SL2/SL1) of the traffic amount in the period 2 to the traffic amount in the period 1 is converged to a normal distribution around the value 1. This is shown in FIG. 11.

Figure 11:
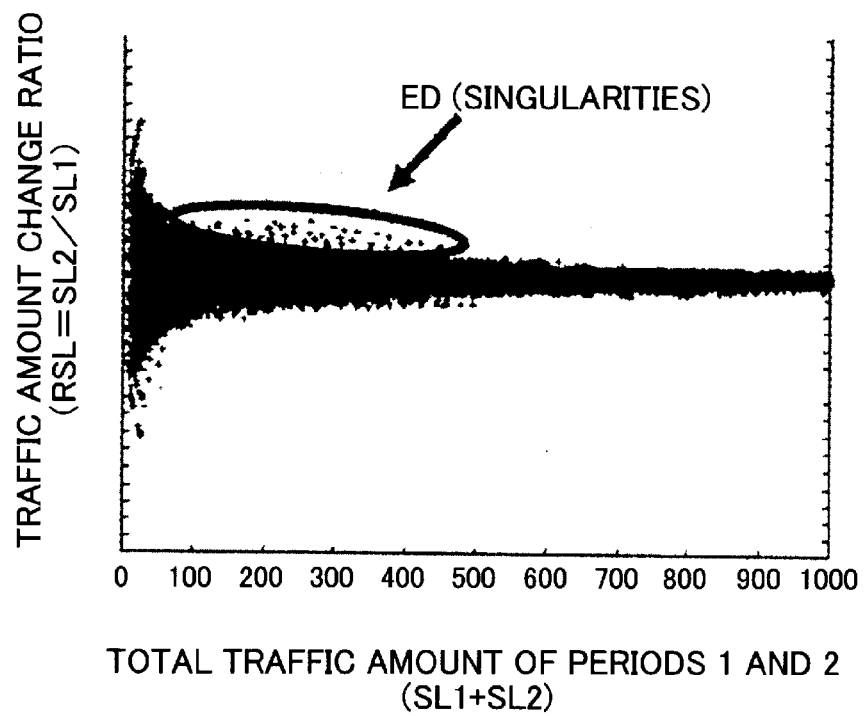
FIG. 11 is a diagram showing one example of singularities of the traffic amount change ratio.

In FIG. 11, the abscissa shows the total traffic amount (SL1+SL2), and the ordinate shows the traffic amount change ratio RSL (SL2/SL1). As illustrated, when the conditions in the period 2 do not differ from the conditions in the period 1, the traffic amount change ratio RSL follows a normal distribution in which the normal probability reaches a maximum of 7.96% at a value 1 (where the traffic amounts in the two periods are equal). Links having values deviated from this normal distribution like an illustrated area ED are then found as singularities by a probability test. More specifically, the procedure determines whether the calculated traffic amount change ratio RSL is a significant deviation from the normal distribution under the reliability condition of 95% or 99% with respect to all the links for which the traffic amount change ratio RSL is calculated. Approximation by the normal distribution aims to simplify the operation of a reliability test. The original binomial distribution may be used for the test. Alternatively another static test, for example, Chi-square test may be used for the same purpose.

Figure 12:
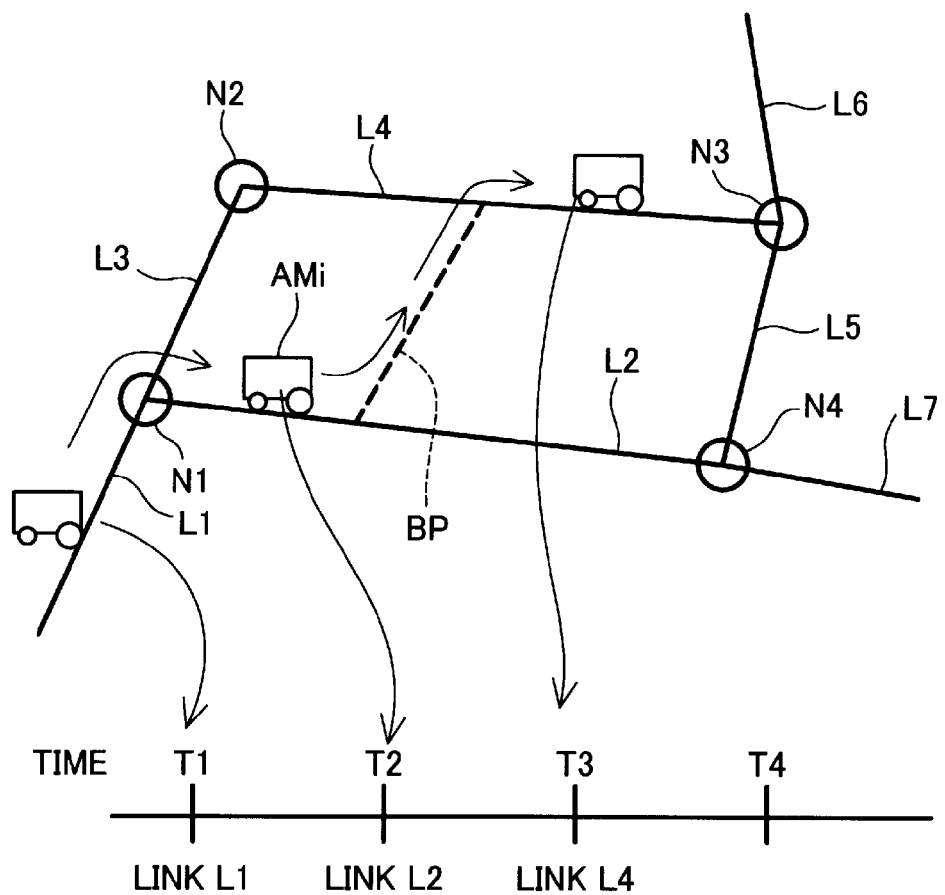
FIG. 12 is a diagram illustrating a change in link array caused by opening of a bypass road.

The jump incident rates are, on the other hand, evaluated by the following procedure. As described above with reference to FIGS. 5 and 7, when link numbers included in the probe information sequentially sent from the probe vehicle AMi represent links discontinuous on the road network database 130 (for example, a sequence of L2 and L4 in FIGS. 5 and 7), a jump incident is detected. Such a jump incident may occur, for example, in the event of opening a new bypass road BP going from the link L2 to the link L4 as shown in FIG. 12. A jump incident may also occur when the probe vehicle AMi fails to analyze and grasp the location by the GPS device 11. When the GPS device 11 of the probe vehicle AMi passing through the link L2 falsely outputs the coordinates of a location on the link L4 or a location close to this location for a certain time period or longer, the probe vehicle AMi outputs a next piece of probe information including data of the link L4.

According to this embodiment, at step S340 in FIG. 10, the jump incident rates are evaluated by the Fisher's probability test. The Fisher's probability test is a statistical test used for analysis of data classified into two categories (i.e., the presence or the absence of jump incident). This embodiment employs the Fisher's probability test, in order to accurately detect changes in jump incident rates determined by using four variables, i.e., the traffic amount in the period 1, the jump incident amount in the period 1, the traffic amount in the period 2 and the jump incident amount in the period 2. FIG. 13 shows an example of data with and without jump incidents in the periods 1 and 2 with respect to a certain link. In this illustrated example, the total number of data is n, where a+b=n=c+d. This test determines the probability of satisfying a hypothesis that "the jump incident rate in the period 2 does not substantially differ from the jump incident rate in the period 1" (null hypothesis). When the total number of samples is n, the generation probability P of the table shown in FIG. 13 is calculated by Expression (2) given below:

$$P = (a!b!c!d!)/(e!f!g!h!n!) \qquad (2)$$

Here "!" is a symbol representing a factorial operation. Since a=e+f, b=g+h, c=e+g and d=f+h, the table shown in FIG. 13 is a table having the degree of freedom of 1 where changing the value e determines all the other values under the condition that the total number n is fixed. The accumulation of the generation probability P to the actually obtained value is calculated by sequentially incrementing the value e from 0.

When the small number n of probe vehicles AMi pass through a specific link L (up to several tens) and a certain number of jump incidents occur, the Fisher's probability test is easily calculable. For example, in an example of observed values shown in the lower table of FIG. 13 (n=50, e=5, f=14, g=7, h=24), the generation probability of this distribution is calculated by Expression (3) given below:

$$(19!31!12!38!)/(5!14!7!24!50!) \text{ is approximately } 0.2519.$$

The sum of the probabilities of more extreme distributions than this distribution of the observed values, i.e., the probabilities at the value e of 0 to 4, is approximately 0.5103. It is accordingly determined that the hypothesis is not deniable (i.e., the jump incident rates in the periods 1 and 2 have no significant difference). In the case of an extremely large volume of the total traffic amount data (SL1+SL2), the Fisher's probability test may have difficulty in calculation. This is attributed to the factorial operation. In the case that the value of the total traffic amount data exceeds the upper limit of factorial operation in the numerical operations of the computer used in the embodiment, it may be determined that the jump incident rate has a significant change when the difference in jump incident rate simply calculated from the numbers of jump incidents in the two periods reaches or exceeds a predetermined level a % (for example, 20%). The Fisher's probability test may not be performed for all the links but may be performed only when the difference between the jump incident rate in the period 1 and the jump incident rate in the period 2 reaches or exceeds a predetermined value. This modification reduces the load by the factorial operation. According to another modification, a processor specialized for factorial operation may be additionally used, and numerical operations including the above factorial operation may be performed independently of the number of data.

As described above, the road network analysis system 10 of the first embodiment analyzes the probe information sent from the probe vehicles AMi and performs the tests of the traffic amount change ratio RSL and the jump incident rates in the two periods. When it is determined that both the traffic amount change ratio RSL and the jump incident rates have significant changes, the road network analysis system 10 detects and output a change in the road network. This enables a change in the road network, for example, opening of a new bypass road, permanent closing of an existing road or long-term temporary closing of an existing road in the road network to be effectively detected. A factor that causes a change in traffic amount, for example, opening or closing of a large commercial facility, on the other hand, does not change the jump incident rates of the surrounding roads. This also reduces the possibility that this factor is misrecognized as a change in the road network. Additionally, this sufficiently eliminates the possibility that apparent jump incidents caused by failure of the GPS device or noise are falsely attributed to a change in the road network. The road network analysis system 10 of the first embodiment thus ensures accurate recognition of an actual change in the road network and enables adequate dispatch and distribution of investigators.

E. Second Embodiment

The following describes a second embodiment of the invention. A road network analysis system 10 of the second embodiment has the same hardware configuration as that of the first embodiment. The second embodiment differs from the first embodiment in the target range of the tests of the traffic amount change ratio RSL and the jump incident rates. While the first embodiment counts the traffic amount and the jump incident rate with respect to each link, the second embodiment employs the following procedure for the counting.

Figure 14:
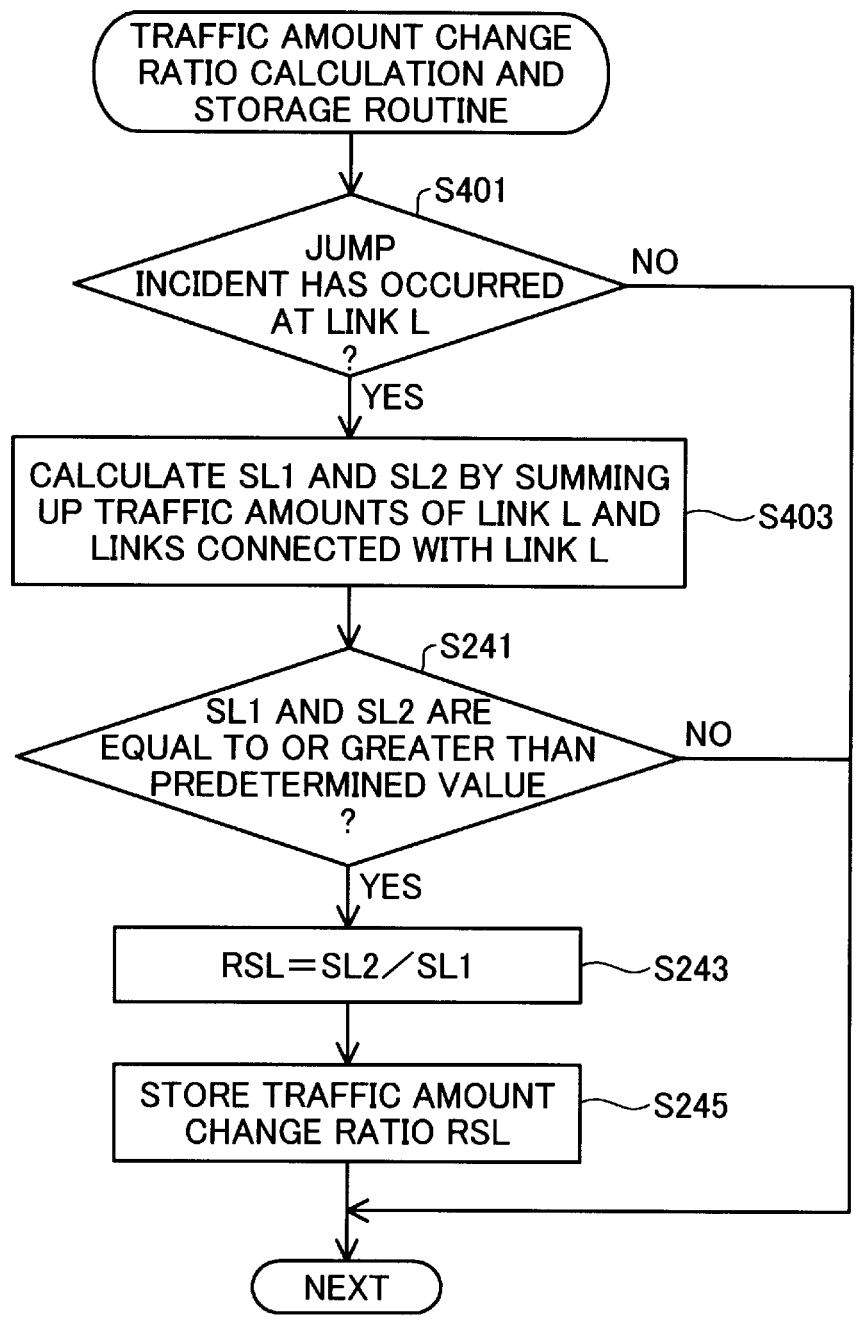
FIG. 14 is a flowchart showing a traffic amount change ratio calculation and storage routine according to a second embodiment.

FIG. 14 shows a traffic amount change ratio calculation and storage routine according to the second embodiment. This routine corresponds to the left-side flowchart of FIG. 9 according to the first embodiment. On the start of this routine, the analyzer 200 first determines whether a jump incident has occurred at a link L of interest (step S401). More specifically, the analyzer 200 refers to the jump incident rate data with respect to the link L stored in the hard disk 205. When it is determined that a jump incident has occurred even once at this link L (step S401: YES), the analyzer 200 calculates traffic amounts SL1 and SL2 of the link L in the respective periods 1 and 2 by summing up the integrated traffic amounts of the link L and links connected with the link L (step S403). The subsequent series of processing is identical with the processing of and after step S241 described in the first embodiment. Although not being specifically illustrated, the analyzer 200 also calculates jump incident rates JL1 and JL2 of the link L in the respective periods 1 and 2 by summing up the integrated jump incident rates of the link L and the connected links at step S403.

Once a jump incident has occurred at a link of interest, the procedure of the second embodiment calculates the traffic amounts and the jump incident rates with respect to the link of interest by respectively summing up the traffic amounts and the jump incident rates of not only the link of interest at which a jump incident has occurred but links directly connected with this link. In the illustrated example of FIG. 12, when the link L4 is the link of interest at which the number of jump incidents is counted, the links L3, L5 and L6 are specified as the target range of integration. Otherwise the procedure of the second embodiment is identical with the procedure of the first embodiment.

The road network analysis system 10 of the second embodiment respectively sums up the integrated traffic amounts and the integrated jump incident rates with respect to the link of interest at which a jump incident has occurred and the links connected with this link of interest. This cancels a change in traffic amount caused by, for example, opening of a new bypass road, in a narrow area as shown in FIG. 12 and makes this change hard to be detected. In the illustrated example of FIG. 12, as the number of vehicles passing through the link L2 via the link L4 to the link L6 is increased by opening of the bypass road BP, the number of vehicles passing through the link L3 or the link L5 to the link L6 is decreased to substantially the same degree. Calculating the traffic amount of the link L4 by adding the integrated traffic amounts of the links L3 and L5 connected with the link L4 accordingly makes a change in traffic amount caused by opening of the bypass road BP hard to be detected. In the case that opening of a bypass road causes a substantial increase in traffic volume in a district, on the other hand, the traffic volumes of a road of interest at which a jump incident has occurred and roads connected with the road of interest are significantly increased. Calculating the traffic amount of the link of interest by adding the integrated traffic amounts of the links connected with the link of interest enables a change in traffic amount to be detected as a more significant change.

In other words, the second embodiment preferentially detects a change in the road network that causes a substantial change in traffic volume in a district. The survey of the road network is often performed in order of priority, in terms of the worker hours and the cost. It is accordingly advantageous to preferentially detect a change in the road network that causes a substantial change in traffic volume. The procedure of the second embodiment may be performed in combination with the procedure of the first embodiment to detect a change in the road network.

F. Third Embodiment

A third embodiment also employs a different traffic amount change ratio calculation and storage routine. FIG. 15 shows the traffic amount change ratio calculation and storage routine according to the third embodiment. As illustrated, the analyzer 200 of the third embodiment identifies links adjacent to the link L (step S411) and calculates traffic amounts SL1 and SL2 of the link L in the respective periods 1 and 2 by summing up the integrated traffic amounts of the link L and the adjacent links (step S413). The subsequent series of processing is identical with the processing of and after step S241 described in the first embodiment. Similarly the analyzer 200 calculates jump incident rates JL1 and JL2 of the link L in the respective periods 1 and 2 by summing up the integrated jump incident rates of the link L and the adjacent links.

The link adjacent to the link L may be a link at least partly present within a specified radius of the link L. Alternatively the adjacent link may be a link registered in advance as an adjacent link of the link L on the road network database 130. Like the second embodiment, the third embodiment preferentially detects a change in the road network that cases a substantial change in traffic volume in a district by respectively summing up the integrated traffic amounts and the integrated jump incident rates of the adjacent links as well as the link of interest.

G. Process of Setting Survey Route

The first to the third embodiments describe the systems configured detect the location where a change in the road network is expected. These systems may additionally be configured to perform a process of setting a survey route. The process of setting a survey route is described in detail in JP 2012-150016A and is only briefly described here. In summary, the system may set a survey route about a link at which a change in the road network has been detected under the following conditions:

Condition 1: a route having a high percentage of links with increases in traffic amount of or above a predetermined level between the periods 1 and 2 and links with decreases in traffic amount of or below a predetermined level between the periods 1 and 2; and Condition 2: a route passing through a node of the higher priority.

The order or priority in Condition 2 is the order of "singular node", "important node" and "node of attention". Condition 2 should be considered when the number of candidate survey routes cannot be reduced to one by Condition 1.

The "singular node" herein means a node having a significant change in traffic amount. Roads are generally expressed by a plurality of links connected by a node representing, for example, an intersection. In the case that the traffic amount of one link connected with a certain node increases but the traffic amount of another link connected with the same node decreases, the node has a little change in traffic amount. The traffic amounts of each node are integrated, and any node having a significant increase or a significant decrease in traffic amount between the periods 1 and 2 is specified as "singular node". The "important node" herein means a node at which a link having an increase in traffic amount between the periods 1 and 2 crosses a link having a decrease in traffic amount between the periods 1 and 2. The "node of attention" herein means a node located at an end of a link having an increase in traffic amount between the periods 1 and 2 or a link having a decrease in traffic amount between the periods 1 and 2.

By taking into account such conditions of nodes, an adequate route can be selected as the survey route, and the survey route can be set to efficiently detect a change in the road network.

H. Modifications

H1. Modification 1

In the embodiments described above, the location information such as latitude longitude information is not included in the probe information sent from the probe vehicle AMi to the server 100. The latitude longitude information obtained by the GPS device mounted on the probe vehicle AMi may, however, be included in the probe information. This modification readily identifies a drive route of the probe vehicle AMi on the occurrence of a jump incident and enables a tentative link corresponding to a new road to be automatically generated. A field survey is generally needed to accurately determine the connection relationship between a new link and the existing links. It is accordingly practical to register a tentative link. In the illustrated example of FIG. 12, the procedure may add a tentative link LX connecting the node N1 with the node N3 to the road network database 130 without creating a new node.

H2. Modification 2

In the embodiments described above, jump incidents are stored in relation to each link. The jump incidents may alternatively be detected and stored in relation to each node instead of each link. When the probe vehicle AMi enters a node and then disappears (i.e., does not go out to a link connected with the node) or when the probe vehicle AMi does not enter a node but suddenly appears (i.e., goes out to a link connected with the node), it is determined that a jump incident occurs at the node.

H3. Modification 3

Modification 3 performs a direct test of the changes in jump incident rates. The first embodiment employs the Fisher's probability test for the test of the changes in jump incident rates. Modification 3 calculates a rate of jump incidents (hereinafter referred to as jump incident rate) RJL1 by dividing the number of jump incidents in the period 1 by the traffic amount in the period 1 and a jump incident rate RJL2 by dividing the number of jump incidents in the period 2 by the traffic amount in the period 2 and subsequently calculates a deviation DRJL between the jump incident rates RJL1 and RJL2. This incident rate deviation DRJL can be handled like the traffic amount change ratio RSL. Under fixed conditions of a road network, the jump incident rates of one identical link occur with the same probabilities in the respective periods 1 and 2, and the probability that the period 1 has the higher jump incident rate than the period 2 is 1/2. The incident rate deviation DRJL may thus be treated as a binomial distribution. A distribution of the jump incident rate with respect to all the links with the incident rate deviation DRJL as the ordinate and the total traffic amount as the abscissa is accordingly similar to the distribution shown in FIG. 11. Links causing a change in the road network are accordingly detectable as singularities deviated from this distribution (binomial distribution or normal distribution). The road network analyzer of Modification 3 detects a change in the road network when the test results indicate both a change in traffic amount change ratio RSL and a change in jump incident rate deviation DRJL.

H4. Modification 4

The road network analyzer of Modification 3 detects a change in the road network when the test results indicate both a change in traffic amount change ratio RSL and a change in jump incident rate deviation DRJL. The road network analyzer of Modification 4 employs the following technique to detect a change in the road network. The road network analyzer of Modification 4 is configured to provide in advance a twodimensional map between the traffic amount change ratio RSL and the jump incident rate deviation DRJL and detect a change in the road network upon determination that the traffic amount change ratio RSL and the jump incident rate deviation DRJL are included in a predetermined area. This configuration enables the following determinations. For example, when the jump incident rate deviation DRJL has a large value, it is determined that the road network is likely to have a change even under the condition of a small traffic amount change ratio RSL. When the traffic amount change ratio RSL has a large value, it is determined that the road network is likely to have a change even under the condition of a relatively small jump incident rate deviation DRJL. Accordingly this configuration enables a change in the road network to be flexibly detected.

H5. Modification 5

Modification 5 performs the test of jump incident rates by learning in place of by the Fisher's probability test. The Fisher's probability test is a mathematically-sound excellent technique, but the time and the resource required for the operation increase with an increase in number of data. The procedure of Modification 5 collects a large number of historical data indicating that the jump incident rate was actually changed by, for example, opening of a new road and learns the changes of the jump incident rates. The procedure then determines whether subsequent changes of the jump incident rates are attributed to a change in the road network by the technique of pattern matching. The matching technique of successively comparing the characteristics of a plurality of patterns may be employed for this matching. Alternatively the technique using a neural network having the learning function based on the back propagation algorithm may be employed to enhance the matching accuracy by learning.

H6. Modification 6

Modification 6 utilizes (A) information that the probe vehicle AMi has a mismatch with the road network situtation, (B) information regarding continuation or discontinuation of the GPS signal at the GPS device or (C) information of the road traffic information communication system, instead of or in addition to the jump incident rates. The information (A) shows that the location information does not match with the actual road conditions on the occurrence of a jump incident from a certain link to another link disconnected from the certain link. This information facilitates estimation that the jump incident is caused by opening of a new road and allows for the accuracy of the test results of the jump incident rates even when the lower standard is used for the test. The information (B) shows that the GPS device 11 is not available, for example, because the probe vehicle AMi enters a tunnel or that the accuracy of location detection by GPS is lowered. By taking into account such information, it is identifiable whether a jump incident is attributed to an apparent link caused by a failure of GPS or an actual change in the road network, for example, opening of a new road.

H7. Modification 7

Modification 7 is an aspect with omitting the server 100, wherein the analyzer 200 performs collection and storage of probe information from the probe vehicles AMi. This aspect simplifies the configuration of the network road analysis system 10.

H8. Modification 8

Modification 8 is an aspect that the probe vehicle detects a jump incident. The probe vehicle storing the road network data can detect a jump incident. In this aspect, the road network analyzer is not required to detect a jump incident (occurrence of discontinuity).

The invention is not limited to the above embodiments, examples or modifications, but a diversity of variations and modifications may be made to the embodiments without departing from the scope of the invention. For example, the technical features of the embodiments, examples or modifications corresponding to the technical features of the respective aspects described in Summary of Invention may be replaced or combined appropriately, in order to solve part or all of the problems described above or in order to achieve part or all of the advantageous effects described above. Any of the technical features may be omitted appropriately unless the technical feature is described as essential herein.

INDUSTRIAL APPLICABILITY

The invention is applicable to analysis of a road network and is more specifically applied to analyze and detect a change in the road network, for example, opening a new route, from probe data. The invention makes a contribution to, for example, the map-making industry accompanied with analysis of the road network.

The invention claimed is:

1. A road network analyzer that analyzes a change in road network by using probe information generated with driving of a vehicle, the road network analyzer comprising:
    a traffic amount calculator configured to determine a traffic amount of vehicles passing through a specified section included in the road network from a plurality of the probe information accumulated over a predetermined period;
    a discontinuity rate calculator configured to determine a discontinuity rate, which is a rate of incidents that a vehicle location is determined as a motion from a part in the road network that is determined to be discontinuous or as a motion to the part in the road network that is determined to be discontinuous in the specified section, from the plurality of probe information accumulated over the predetermined period; and
    a detector configured to detect a change in the road network, based on a degree of change between traffic amounts in two different periods with respect to the specified section included in the road network and a degree of change between discontinuity rates in the two different periods.

2. The road network analyzer according to claim 1, wherein
    the discontinuity rate calculator checks the probe information against road network data of the road network and determines whether an incident that the vehicle locations are discontinuous occurs, so as to determine the discontinuity rate.

3. The road network analyzer according to claim 1, wherein
    road network data of the road network includes links corresponding to roads and nodes representing ends of the links,
    a specified part of the road network data includes at least one of the links and a node representing at least one end of the link,
    the probe information includes information of identifying a link or a node where the vehicle has passed through,
    the traffic amount is number of vehicles which have passed through the link or the node included in the specified part, and
    the discontinuity rate is a ratio of number of vehicles which have passed through a link or a node specified as discontinuous to the traffic amount.

4. The road network analyzer according to claim 1, further comprising:
    a probe information acquirer configured to obtain the probe information sent from the vehicle.

5. The road network analyzer according to claim 1, wherein
    the degree of change between the traffic amounts in the two different periods with respect to the specified section included in the road network is a ratio of the traffic amount in one of the two periods to the traffic amount in the other of the two periods.

6. The road network analyzer according to claim 1, wherein
the degree of change between the discontinuity rates in the two different periods is a difference by subtracting the discontinuity rate in one of the two periods from the discontinuity rate in the other of the two periods.

7. The road network analyzer according to claim 6, wherein
the detector detects a change in the specific section of the road network when a deviation of a ratio of the traffic amount in one of the two periods to the traffic amount in the other of the two periods from a steady-state value is equal to or greater than a predetermined level and when a deviation of the difference of the discontinuity rate from a steady-state value is equal to or greater than a predetermined level.

8. The road network analyzer according to claim 7, wherein
the deviation of the ratio of the traffic amount from the steady-state value is evaluated by a deviation from a binomial distribution or a normal distribution.

9. The road network analyzer according to claim 1, wherein
the degree of change of the discontinuity rate is evaluated by Fisher's probability test.

10. A road network analysis system, comprising:
a probe vehicle configured to generate probe information with driving of the vehicle; and
an analyzer configured to receive the probe information from the probe vehicle and analyze a road network, wherein
the probe vehicle comprises a transmitter configured to refer to link-node information correlated to the road network and send information of a link and/or a node which the probe vehicle has passed as part of the probe information,
the analyzer comprises:
a probe information accumulator configured to receive the probe information sent from a plurality of the probe vehicles and accumulate the received probe information over a predetermined period;
a traffic amount calculator configured to determine a traffic amount of vehicles passing through a specified section included in the road network from a plurality of the probe information accumulated over the predetermined period;
a discontinuity rate calculator configured to determine a discontinuity rate, which is a rate of incidents that a vehicle location is determined as a motion from a part in the road network that is determined to be discontinuous or as a motion to the part in the road network that is determined to be discontinuous in the specified section, from the plurality of probe information accumulated over the predetermined period; and
a detector configured to detect a change in the road network, based on a degree of change between traffic amounts in two different periods with respect to the specified section included in the road network and a degree of change between discontinuity rates in the two different periods.

11. A road network analysis method that analyzes a change in road network by using probe information generated with driving of a vehicle, the road network analysis method comprising:
determining via a processor, a traffic amount of vehicles passing through a specified section included in the road network from a plurality of the probe information accumulated over a predetermined period;
determining via the processor, a discontinuity rate, which is a rate of incidents that a vehicle location is determined as a motion from a part in the road network that is determined to be discontinuous or as a motion to the part in the road network that is determined to be discontinuous in the specified section, from the plurality of probe information accumulated over the predetermined period; and detecting via the processor, a change in the road network, based on a degree of change between traffic amounts in two different periods with respect to the specified section included in the road network and a degree of change between discontinuity rates in the two different periods.

12. A program product having a non-transitory computer readable medium and program stored therein, wherein the program is readable by a computer and causes the computer to perform a process of analyzing a change in road network by using probe information generated with driving of a vehicle, the program causing the computer to implement:
a first function of determining a traffic amount of vehicles passing through a specified section included in the road network from a plurality of the probe information accumulated over a predetermined period;
a second function of determining a discontinuity rate, which is a rate of incidents that a vehicle location is determined as a motion from a part in the road network that is determined to be discontinuous or as a motion to the part in the road network that is determined to be discontinuous in the specified section, from the plurality of probe information accumulated over the predetermined period; and
a third function of detecting a change in the road network, based on a degree of change between traffic amounts in two different periods with respect to the specified section included in the road network and a degree of change between discontinuity rates in the two different periods.

* * * * *